United States Patent
Kwak et al.

(10) Patent No.: US 10,805,919 B2
(45) Date of Patent: Oct. 13, 2020

(54) METHOD FOR TRANSMITTING/RECEIVING DOWNLINK DATA AND DEVICE THEREFOR

(71) Applicant: LG ELECTRONICS INC., Seoul (KR)

(72) Inventors: Kyuhwan Kwak, Seoul (KR); Seungmin Lee, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/473,237

(22) PCT Filed: Sep. 28, 2018

(86) PCT No.: PCT/KR2018/011511
§ 371 (c)(1),
(2) Date: Jun. 24, 2019

(87) PCT Pub. No.: WO2019/066539
PCT Pub. Date: Apr. 4, 2019

(65) Prior Publication Data
US 2019/0342866 A1 Nov. 7, 2019

Related U.S. Application Data

(60) Provisional application No. 62/565,056, filed on Sep. 28, 2017, provisional application No. 62/567,197, (Continued)

(51) Int. Cl.
*H04W 72/04* (2009.01)
*H04W 88/16* (2009.01)

(52) U.S. Cl.
CPC ..... *H04W 72/042* (2013.01); *H04W 72/0446* (2013.01); *H04W 88/16* (2013.01)

(58) Field of Classification Search
CPC ........... H04W 72/042; H04W 72/0446; H04W 88/16; H04L 5/00
See application file for complete search history.

(56) References Cited

U.S. PATENT DOCUMENTS

2013/0265951 A1 10/2013 Ng et al.
2016/0095093 A1* 3/2016 Yi .......................... H04L 5/001
370/280
(Continued)

FOREIGN PATENT DOCUMENTS

KR 1020150073971 7/2015
KR 1020150117650 10/2015
(Continued)

OTHER PUBLICATIONS

PCT International Application No. PCT/KR2018/011511, Notification of Transmittal of the International Search Report and the Written Opinion of the International Searching Authority, or Declaration dated Jan. 8, 2019, 9 pages.
(Continued)

*Primary Examiner* — Peter Chen
(74) *Attorney, Agent, or Firm* — Lee Hong Degerman Kang Waimey

(57) ABSTRACT

The present invention provides a method for a user equipment to receive downlink data. Particularly, the method includes: receiving information related to one or more control resource sets for downlink control information; receiving rate matching information related to whether or not to receive downlink data in each of the one or more control resource sets; and receiving the downlink data in each of the one or more control sets on the basis of the rate matching information, wherein, if the rate matching information includes first information, the downlink data are not
(Continued)

received in the control resource set in which the downlink control information has not been detected.

11 Claims, 12 Drawing Sheets

Related U.S. Application Data filed on Oct. 2, 2017, provisional application No. 62/569,629, filed on Oct. 9, 2017.

(56) References Cited

U.S. PATENT DOCUMENTS

| | | | |
|---|---|---|---|
| 2017/0257860 A1 | 9/2017 | Nam et al. | |
| 2019/0116583 A1* | 4/2019 | Sahlin | H04L 5/0048 |
| 2019/0174531 A1* | 6/2019 | Takeda | H04W 72/0446 |

FOREIGN PATENT DOCUMENTS

| | | |
|---|---|---|
| KR | 101641968 | 7/2016 |
| KR | 1020170007175 | 1/2017 |
| KR | 101712911 | 3/2017 |
| KR | 101749119 | 6/2017 |
| WO | 2017048324 | 3/2017 |
| WO | 2017101107 | 6/2017 |

OTHER PUBLICATIONS

Korean Intellectual Property Office Application No. 10-2018-0115860, Office Action dated Jan. 23, 2019, 4 pages.
Fujitsu, "CSI-RS resource indication for PDSCH rate matching", 3GPP TSG RAN WG1 Meeting #90, R1-1712737, Aug. 2017, 3 pages.
European Patent Office Application Serial No. 18860766.7, Search Report dated Jul. 8, 2020, 7 pages.
Intel Corporation, "Resource sharing between PDCCH and PDSCH", R1-1716307, 3GPP TSG RAN WG1 Meeting NR#3, Sep. 2017, 5 pages.
Japan Patent Office Application No. 2019-558325, Office Action dated Jul. 28, 2020, 2 pages.
Samsung, "Multiplexing NR-PDCCH and PDSCH", R1-1715980, 3GPP TSG RAN WG1 Meeting NR#3, Sep. 2017, 4 pages.
ZTE, "Downlink control channels for shortened TTI", R1-162402, 3GPP TSG RAN WG1 Meeting #84bis, Apr. 2016, 7 pages.

* cited by examiner

FIG. 2
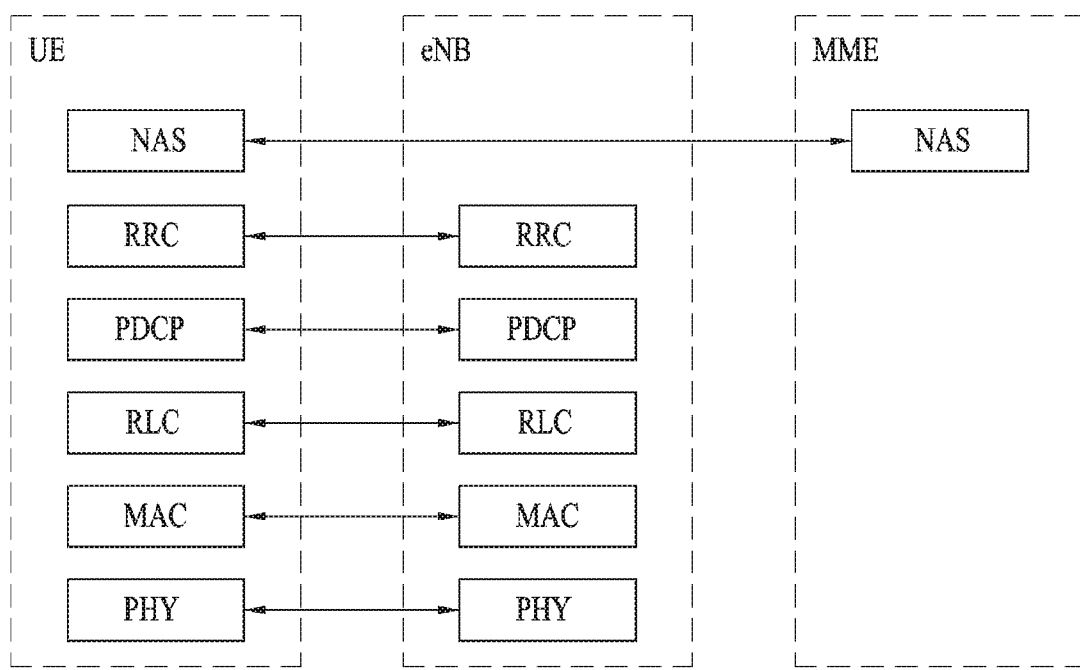
(A) CONTROL-PLANE PROTOCOL STACK
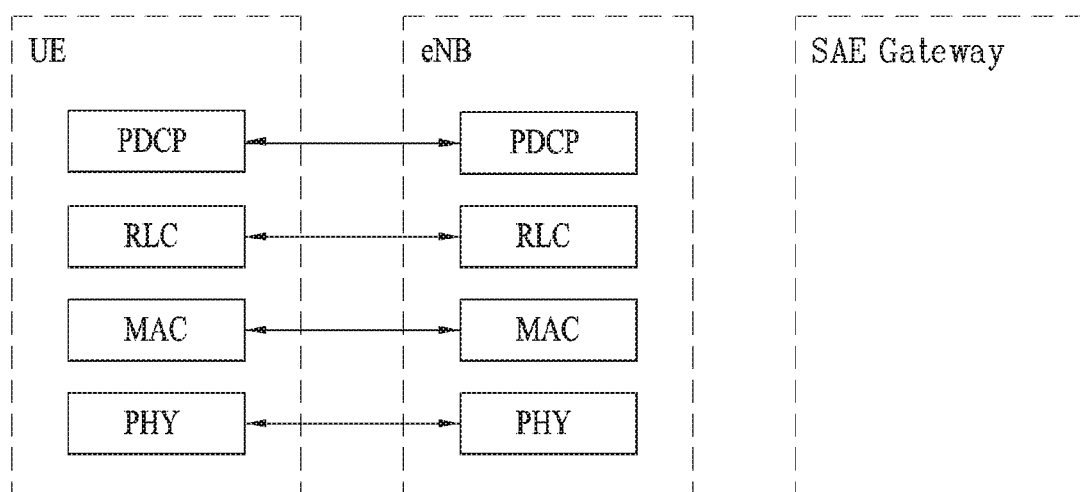
(B) USER-PLANE PROTOCOL STACK

FIG. 6
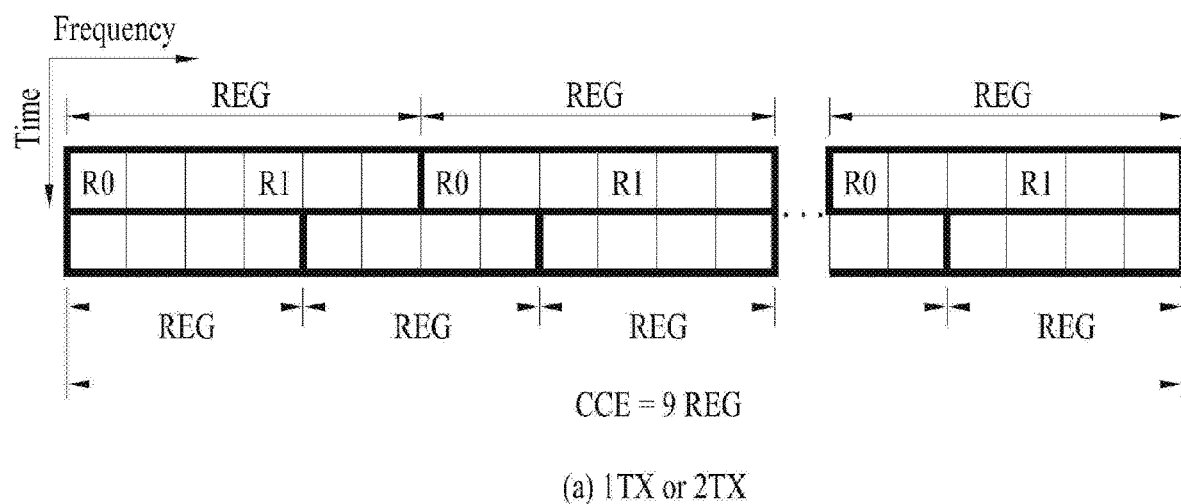
(a) 1TX or 2TX
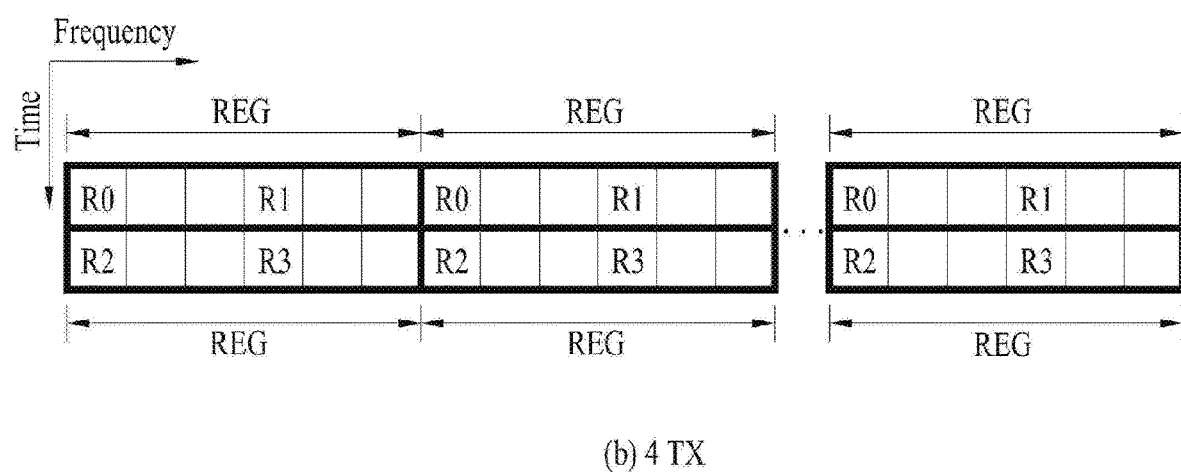
(b) 4 TX

FIG. 8

METHOD FOR TRANSMITTING/RECEIVING DOWNLINK DATA AND DEVICE THEREFOR

CROSS-REFERENCE TO RELATED APPLICATIONS

This application is the National Stage filing under 35 U.S.C. 371 of International Application No. PCT/KR2018/011511, filed on Sep. 28, 2018, which claims the benefit of U.S. Provisional Application Nos. 62/565,056, filed on Sep. 28, 2017, 62/567,197, filed on Oct. 2, 2017, and 62/569,629, filed on Oct. 9, 2017, the contents of which are all hereby incorporated by reference herein in their entirety.

TECHNICAL FIELD

The present disclosure relates to a method and apparatus for transmitting and receiving downlink data, and more particularly, to a method and apparatus for transmitting and receiving downlink data in a resource block set configured for transmission and reception of downlink control information.

BACKGROUND ART

A brief description will be given of a 3rd generation partnership project long term evolution (3GPP LTE) system as an example of a wireless communication system to which the present disclosure can be applied.

FIG. 1 illustrates a configuration of an evolved universal mobile telecommunications system (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network," respectively.

Referring to FIG. 1, the E-UMTS system includes a user equipment (UE), an evolved Node B (eNode B or eNB), and an access gateway (AG) which is located at an end of an evolved UMTS terrestrial radio access network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides downlink (DL) or uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, hybrid automatic repeat request (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A core network (CN) may include an AG and a network node for user registration of UEs. The AG manages the mobility of UEs on a tracking area (TA) basis. A TA includes a plurality of cells.

While the development stage of wireless communication technology has reached LTE based on wideband code division multiple access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An aspect of the present disclosure is to provide a method and apparatus for transmitting and receiving downlink data.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving downlink data at a user equipment (UE) in a wireless communication system includes receiving information related to at least one control resource set for downlink control information, receiving rate matching information related to whether the downlink data is received in each of the at least one control resource set, and receiving the downlink data in each of the at least one control resource set based on the rate matching information. If the rate matching information includes first information, the downlink data may not be received in a control resource set in which the downlink control information has not been detected.

If the rate matching information includes the first information, the downlink data may be received in a control resource set in which the downlink control information has been detected.

Further, if the rate matching information includes second information, the downlink data may not be received in a control resource set in which the downlink control information has been detected.

The downlink control information may be for a short transmission time interval (TTI).

Further, the downlink data may not be mapped to a resource element group (REG) for the downlink control information.

In another aspect of the present disclosure, a UE for receiving downlink data in a wireless communication system may include a transceiver configured to transmit and receive wireless signals to and from a BS, and a processor configured to control the transceiver. The processor is configured to control the transceiver to receive information related to at least one control resource set for downlink control information, to control the transceiver to receive rate matching information related to whether the downlink data is received in each of the at least one control resource set, and to control the transceiver to receive the downlink data in each of the at least one control resource set based on the rate matching information. If the rate matching information includes first information, the downlink data may not be received in a control resource set in which the downlink control information has not been detected.

If the rate matching information includes the first information, the downlink data may be received in a control resource set in which the downlink control information has been detected.

Further, if the rate matching information includes second information, the downlink data may not be received in a control resource set in which the downlink control information has been detected.

Further, the downlink control information may be for a short TTI.

Further, the downlink data may not be mapped to an REG for the downlink control information.

In another aspect of the present disclosure, a method of transmitting downlink data at a BS in a wireless communication system includes transmitting information related to at least one control resource set for downlink control information, transmitting rate matching information related to whether the downlink data is transmitted in each of the at least one control resource set, and transmitting the downlink data in each of the at least one control resource set based on the rate matching information. If the rate matching information includes first information, the downlink data may not be transmitted in a control resource set in which the downlink control information is not transmitted.

In another aspect of the present disclosure, a BS for transmitting downlink data in a wireless communication system includes a transceiver configured to transmit and receive wireless signals to and from a UE, and a processor configured to control the transceiver. The processor is configured to control the transceiver to transmit information related to at least one control resource set for downlink control information, to control the transceiver to transmit rate matching information related to whether the downlink data is transmitted in each of the at least one control resource set, and to control the transceiver to transmit the downlink data in each of the at least one control resource set based on the rate matching information. If the rate matching information includes first information, the downlink data may not be transmitted in a control resource set in which the downlink control information is not transmitted.

Advantageous Effects

According to the present disclosure, data transmission efficiency may be increased by transmitting data in part of a resource block set configured to deliver downlink control information.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 2 illustrates a control-plane protocol stack and a user-plane protocol stack in a radio interface protocol architecture conforming to a 3rd generation partnership project (3GPP) radio access network standard between a user equipment (UE) and an evolved UMTS terrestrial radio access network (E-UTRAN).

FIG. 6 illustrates resource units used to configure a DL control channel in LTE.

FIG. 8 illustrates a method of transmitting downlink control information (DCI) in a resource block set according to an embodiment of the present disclosure.

BEST MODE FOR CARRYING OUT THE INVENTION

Figure 1:
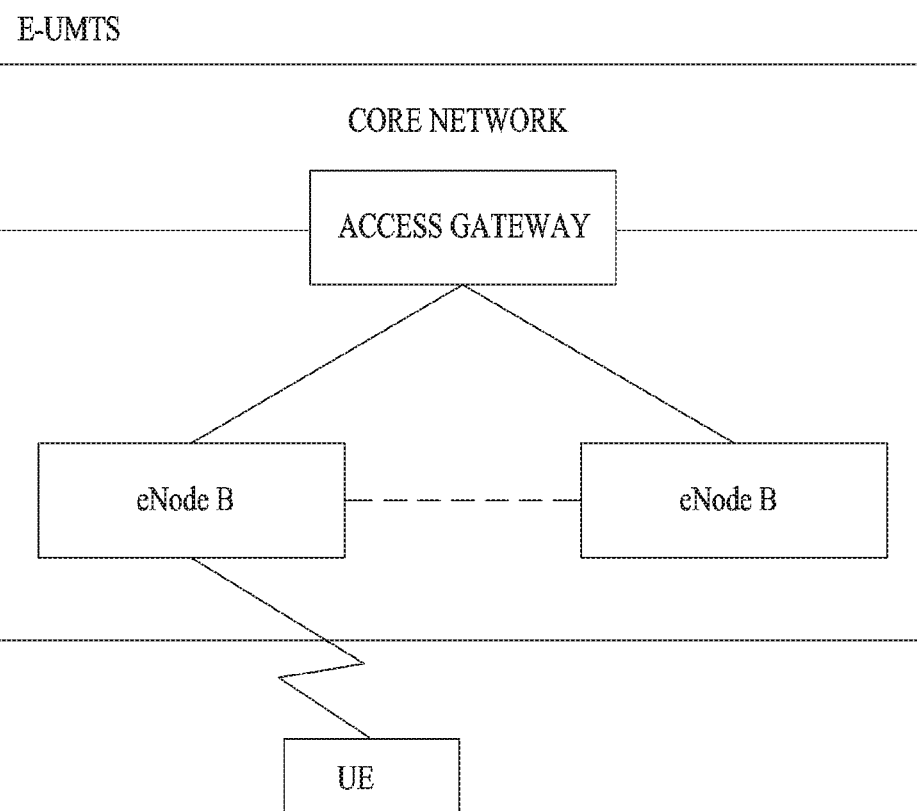
FIG. 1 illustrates a configuration of an evolved universal mobile telecommunications system (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

Although the embodiment of the present disclosure is described based on an LTE system and an LTE-A system in this specification, the LTE system and the LTE-A system are only exemplary and may be applied to all systems corresponding to the aforementioned definition. While the embodiment of the present disclosure is described in the context of frequency division duplexing (FDD), this is exemplary, and the embodiment of the present disclosure is easily applicable to half-frequency division duplexing (H-FDD) or time division duplexing (TDD) through some modification.

FIG. 2 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at Layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at Layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A non-access stratum (NAS) layer above the RRC layer performs functions including session management and mobility management.

A single cell managed by an eNB is set to operate in one of the bandwidths of 1.25, 2.5, 5, 10, 15 and 20 MHz and provides DL or UL transmission service to a plurality of UEs in the bandwidth. Different cells may be configured so as to provide different bandwidths.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a common control channel (CCCH), a multicast control channel (MCCH), a multicast traffic channel (MTCH), etc.

Figure 3:
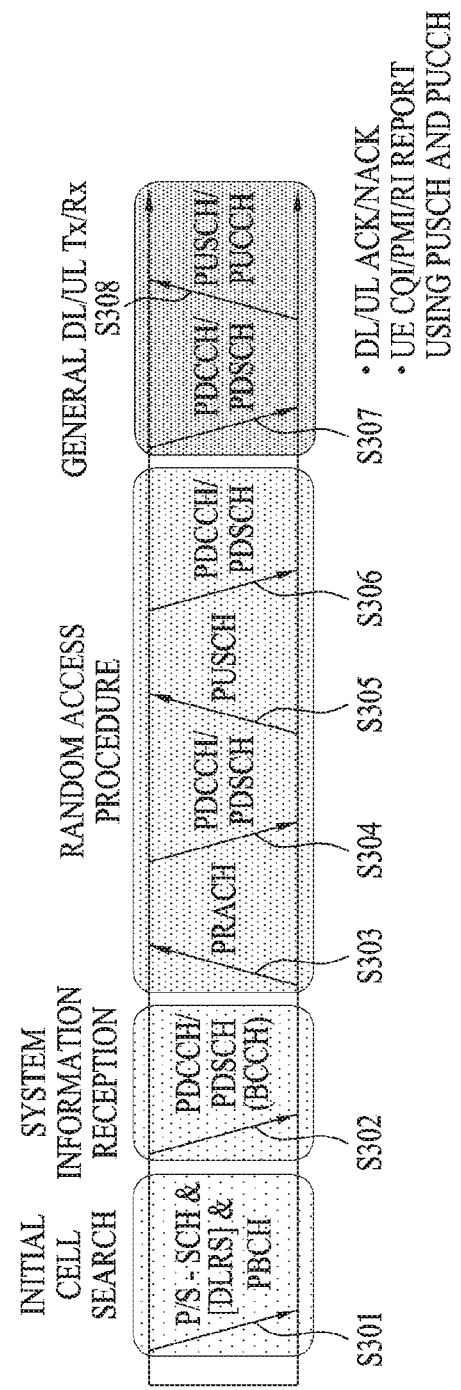
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell identifier (ID) and other information by receiving a Primary Synchronization Channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a physical random access channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a physical uplink shared channel (PUSCH) and/or a physical uplink control channel (PUCCH) to the eNB (S308), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 4:
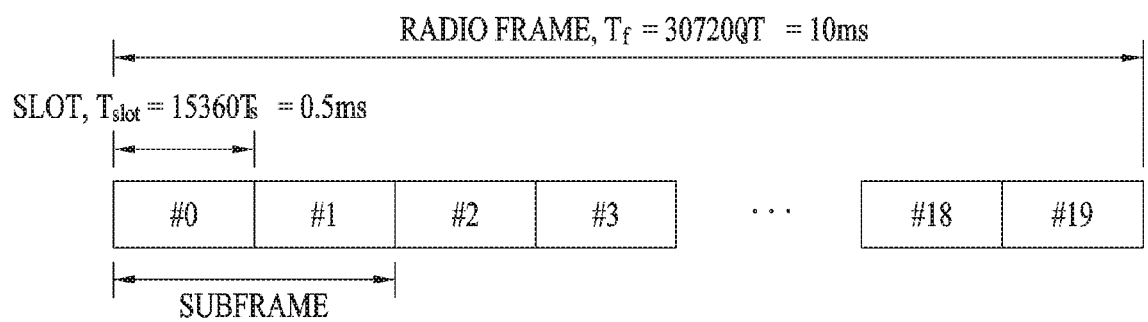
FIG. 4 illustrates a structure of a radio frame in a long term evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of resource blocks (RBs) in the frequency domain. In the LTE system, one RB includes 12 subcarriers by 7 (or 6) OFDM symbols. A unit time during which data is transmitted is defined as a transmission time interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
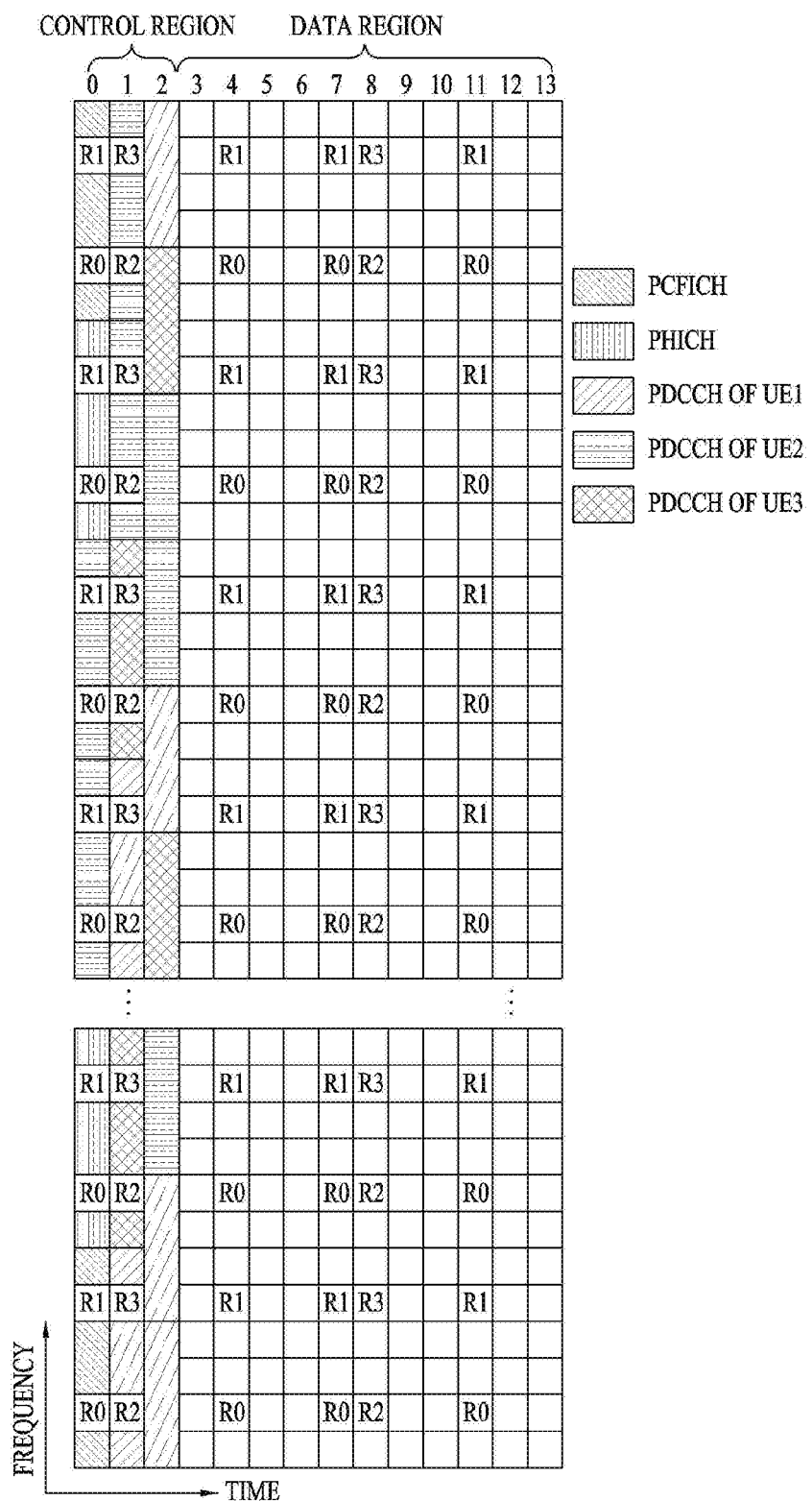
FIG. 5 illustrates a structure of a downlink (DL) radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-ARQ indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 resource element groups (REGs), each REG being distributed to the control region based on a cell identity (ID). One REG includes 4 resource elements (REs). An RE is a minimum physical resource defined by one subcarrier by one OFDM symbol. The PCFICH is set to 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a spreading factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 6 illustrates resource units used to configure a downlink control channel in LTE. FIG. 6(a) shows a case in which the number of transmit (Tx) antennas is 1 or 2 and FIG. 6(b) shows a case in which the number of Tx antenna is 4. Although a different RS pattern is used according to the number of Tx antennas, REs are configured for a DL control channel in the same manner.

Referring to FIG. 6, a basic resource unit of a DL control channel is an REG. The REG includes four contiguous REs except for REs carrying RSs. REGs are marked with bold lines in FIG. 6. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ (≥L) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 7:
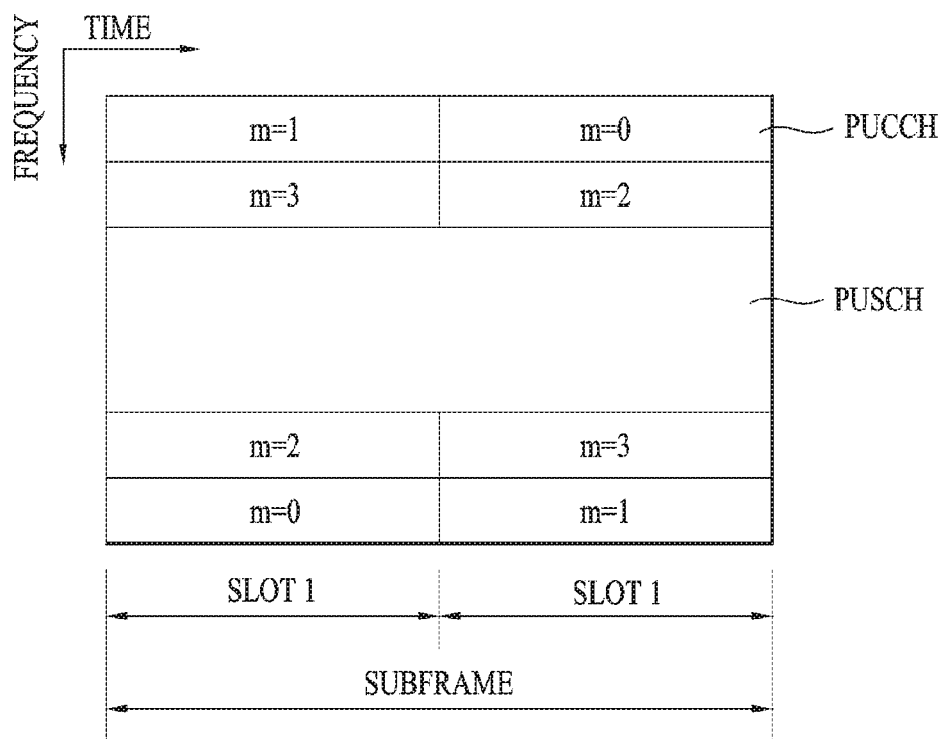
FIG. 7 illustrates a structure of an uplink (UL) subframe in the LTE system.

FIG. 7 illustrates a structure of a UL subframe in the LTE system.

Referring to FIG. 7, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 7.

Now, a description will be given of a method of transmitting and receiving DL data in an RB set configured for DCI transmission according to an embodiment of the present disclosure.

In a communication system, a base station (BS) may indicate a series of operations for data transmission and reception to a UE by transmitting DCI on a PDCCH to the UE. The BS may adjust the reliability of the DCI based on a channel environment about which information is fed back by the UE and transmit the DCI with the adjusted reliability to the UE.

For a UE in a poor channel environment, for example, the BS may transmit DCI at a low code rate in more control channel areas to the UE, thereby increasing the reliability of the DCI transmission. The UE defines multiple assumptions for PDCCH candidate areas available for DCI transmission, and attempts blind decoding (BD) for each of the defined assumptions.

If the UE succeeds in decoding the DCI during BD for each of the defined assumptions, the UE performs a specific operation according to the decoded DCI.

In this case, the remaining resources except for resources carrying the DCI in resources allocated to a PDCCH are empty. If the empty resources are used for data transmission, resource use efficiency and data transmission throughput may be increased. Particularly when a resource area configured for data transmission within a TTI is not large in a system using a short TTI (sTTI), this operation may be useful.

Accordingly, the present disclosure proposes a method of using part of a resource region configured for DCI transmission to transmit DL data to a UE in a communication system. While a claimed invention and/or an embodiment may be considered to be a proposed method in the present disclosure, a combination of claimed inventions and/or embodiments may also be considered to be a new method.

In the present disclosure, the BS may configure a different parameter for the UE on an RB set basis and/or according to a DCI mapping scheme, that is, distributed mapping or localized mapping. Further, the configured parameter may be different according to a cell-specific reference signal (CRS)-based or demodulation reference signal (DMRS)-based operation and/or according to a time-first mapping scheme or a frequency-first mapping scheme.

In a legacy LTE system, for example, one or more symbols at the start of a 1-ms subframe may be configured for a PDCCH, and a BS transmits DCI on the PDCCH to a UE. To aggregate one or more control channel elements (CCEs) according to the state of a channel carrying the DCI, a plurality of aggregation levels (ALs) are configured and DCI decoding is attempted by BD.

This operation may be applied in the same manner to an environment with a different TTI unit from that of the legacy LTE system. For example, the operation may be applied in the same manner to a communication system operating with an sTTI shorter than the TTI of the legacy LTE system.

While the present disclosure is described in the context of a system having an sTTI unit by way of example, the present disclosure is not limited to the system. Further, short REG (sREG), short CCE (sCCE), and short DCI (sDCI) as described herein are applicable as the counterparts of REG, CCE, and DCI, not limited to a system having an sTTI unit. That is, the terms sREG, sCCE, and sDCI are interchangeably used with REG, CCE, and DCI.

An sREG may be used as a basic unit for DCI transmission in an sTTI environment, and configured as one symbol in time by one RB in frequency.

Further, an sCCE may include a plurality of sREGs, and sDCI may be transmitted in one or more sCCEs according to an AL. DCI may be transmitted in a control RB set configured by the BS, and the control RB set may include a variable number of RBs and a variable number of symbols according to a BS configuration. When DCI is transmitted in one or more sCCEs corresponding to an AL, the sCCEs may be mapped to contiguous physical resources included in a control RB set in a localized scheme, or non-contiguous physical resources included in the control RB set in a distributed scheme.

The BS may configure a control RB set for the UE, and transmit data through rate matching in an RB carrying sDCI in the control RB set. That is, an sREG in a symbol adjacent to an sREG for sDCI in the same RB is transmitted empty. The BS may use the empty sREG area to transmit sDCI to another UE, and indicate whether data is to be transmitted in the empty sREG area by a specific indicator through higher-layer signaling and/or physical-layer signaling. The specific indicator may be transmitted in sDCI or separately from the sDCI. The specific indicator may be 1 bit.

Figure 8:
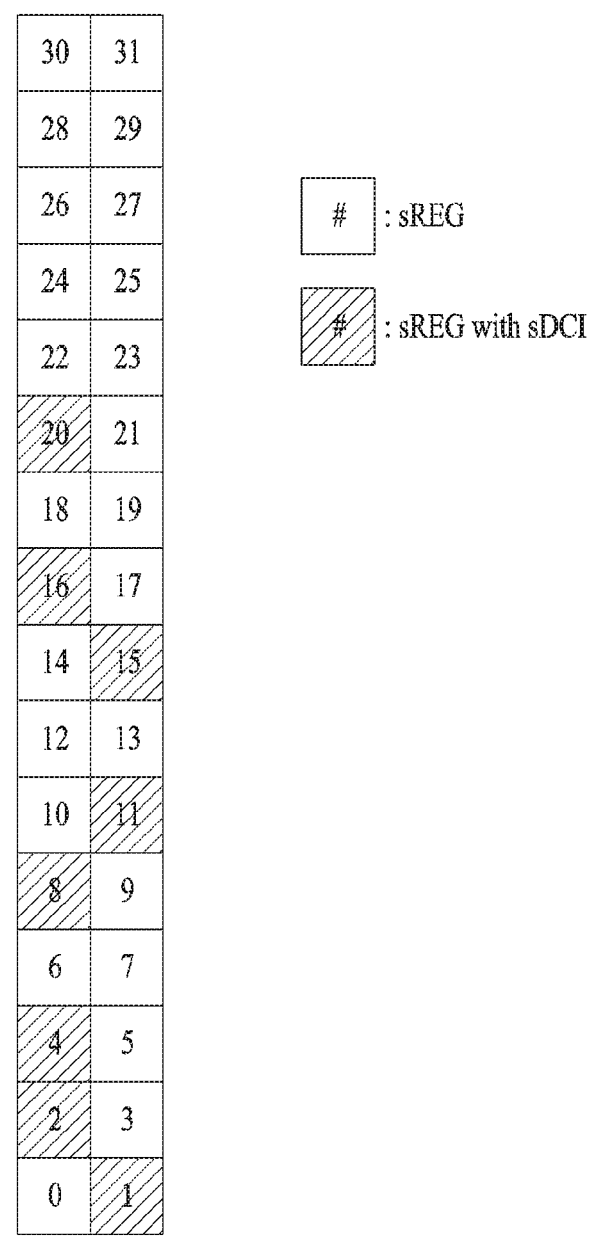

Referring to FIG. 8, specifically, if one sCCE includes four sREGs, a control RB set may be configured as illustrated in FIG. 8. For AL=2, sDCI may be transmitted in sREGs 1, 2, 4, 8, 11, 15, 16, and 20 corresponding to two sCCEs. In this case, basically, data may be rate-matched in the remaining sREGs except for RBs carrying the sDCI. In other words, the data may be rate-matched in sREGs 6, 7, 12, 13, 18, 19, and 22 to 31. Herein, the size of an sREG is one RB, and thus one RB may correspond to the size of an sREG in FIG. 8.

On the other hand, for sREGs 0, 3, 5, 9, 10, 14, 17, and 21 which do not carry the sDCI in the RBs carrying the sDCI, the BS may indicate whether data is rate-matched in the corresponding areas by the 1-bit indicator through higher-layer signaling and/or physical-layer signaling. In other words, the UE may decode the control RB set, assuming that all of sREGs 0, 3, 5, 9, 10, 14, 17, and 21 may carry data or may be transmitted empty according to the 1-bit indicator.

The 1-bit indicator is not necessarily 1 bit, and may include a plurality of bits, when needed. The indicator may specify a specific mode to indicate whether data is transmitted through rate matching in the control RB set to the UE. For example, if data rate-matching information is set to 'mode m', the UE may interpret the information as meaning that a control RB set in which sDCI for the UE has been detected is wholly empty, not carrying data. That is, if the indicator or the rate matching information indicates a specific value or mode in the above example, the UE may decode the control RB set, assuming that all of sREGs 0, 3, 5, 9, 10, 14, 17, and 21 are transmitted empty.

The above example may be applied to a case in which sDCI is distributed at an sREG level in a control RB set. In other words, if there is a co-existent control RB set in which sDCI is distributed at a level other than an sREG level, for example, at an sCCE level, the bit may not be transmitted or may be used as a virtual CRC for the control RB set. For example, a 1-bit field in an sDCI format may be used for dynamically indicating data rate-matching for a CRS-based RB set, and may be used as a virtual CRC for a DMRS-based RB set.

Specifically, sCCEs, sREGs, or RBs in an area overlapped with an sPDSCH in a control RB set may be grouped. Then, the BS may indicate one of the groups for use in data transmission or whether each group is used for data transmission by a bitmap to the UE. The BS may transmit information about the grouping to the UE by higher-layer signaling and/or physical-layer signaling.

For example, the granularity X of each group (e.g., the number of sCCEs, the number of sREGs, or the number of RBs) may be indicated such that a total of $$\left| \frac{\text{total number of } sCCEs, sREGs, \text{ or } RBs \text{ in } RB \text{ set}}{X} \right|$$

groups are produced, and it may be indicated for each group by a bitmap whether data is transmitted through rate matching in the group. However, in the case of grouping based on the number of RBs, if the control RB set includes a plurality of symbols, the number of RBs may mean the number of RBs per symbol.

If the size of the control RB set is not a multiple of the indicated group granularity, the first or last group may include only sREGs, sCCEs, or RBs which are not included in the other groups formed based on the indicated granularity.

Further, the above-described bitmap information may be signaled UE-specifically or UE-commonly. The BS may indicate the starting sCCE index of the grouping in the control RB set and/or the number of sCCEs per group to the UE by higher-layer signaling and/or physical-layer signaling.

For example, if the BS indicates the number of groups to the UE, the granularity of each group may be set to [(total number of sCCEs to be groued)/(number of groups)]. If the total number of sCCEs to be grouped is not a multiple of the number of groups, the first or last group may include only sREGs, sCCEs, or RBs which are not included in the other groups. The UE may then receive data, assuming that data is rate-matched in a group in which sDCI for the UE is detected, without an additional bit indication. Therefore, the number of bits in the bitmap may be reduced. In other words, the BS may transmit data to a specific UE by rate-matching the data in a group carrying sDCI for the specific UE. Herein, the BS does not transmit any additional bit indication for the group carrying the sDCI to the UE, thereby reducing the number of bits in the bitmap.

In another method, the UE may assume that data is not transmitted in a group in which sDCI for the UE has been detected, without any additional indication. Therefore, the number of bits in the bitmap may be reduced. In other words, the BS may not transmit data to a specific UE in a group carrying sDCI for the specific UE. Herein, the BS does not transmit any separate bit indication to this effect to the UE, thereby reducing the number of bits in the bitmap.

The value of X may be set to be different for each control RB set. If X is represented in unit of sCCEs, the minimum value of X may be equal to or larger than a minimum AL configured for the control RB set. That is, the number of bits may be set to be different for each control RB set.

Further, on the assumption of a specific system-configurable granularity and control RB set size, such as a system-configurable minimum granularity and maximum control RB set size, the number of bits for sDCI may be set. If a smaller number of bits than the set number of bits are used for sDCI transmission, the remaining bits may be zero-padded and used as a virtual CRC.

In the case where the indication field for sDCI is designed to have a different size for each control RB set, the UE may perform BD for each control RB set, assuming a large bit size among the bit sizes of all sDCI formats (or the bit sizes of corresponding sDCI formats) configured for multiple control RB sets, and perform zero padding for an indication field corresponding to a control RB set having a smaller bit size than that of the assumed sDCI format. Besides, the UE may perform BD based on a different sDCI format size without zero padding on a control RB set basis.

If a plurality of control RB sets are configured in a specific TTI, the UE may receive, from the BS, information or an indicator indicating whether a control RB set in which sDCI (or an sPDCCH) for the UE is not detected is wholly empty or carries data through rate matching by higher-layer signaling and/or physical-layer signaling.

The information or indicator indicating whether data is transmitted through rate matching in the control RB set may specify a specific mode to the UE. For example, if the information or indicator related to rate matching of data is set to 'mode n', the UE may interpret 'mode n' as meaning that a control RB set in which sDCI for the UE is not detected is wholly empty, not carrying data. Further, when the UE interprets that a control RB set in which sDCI for the UE is not detected does not carry data, the UE may attempt data decoding, assuming that data is transmitted in a control RB set in which sDCI for the UE is detected.

If it is indicated to the UE in the above manner that data is not mapped in a control RB set in which sDCI for the UE is not detected, the control RB set may be advantageously utilized for another usage (e.g., transmission of sDCI to another UE). However, if the UE has a large amount of transmission data and is placed in a good channel environment, the control RB set in which sDCI for the UE is not detected may be used for data transmission, thereby increasing data throughput.

Accordingly, since it is indicated whether data is rate-matched in a control RB set in which sDCI for a UE is not detected, according to the capability, amount of transmission data, and transmission environment of the UE, a BS uses the control RB set for data transmission to the UE or sDCI transmission to another UE according to the indication in the foregoing embodiment. Therefore, resources may be utilized more efficiently.

The above operation will be described below in greater detail with reference to FIGS. 9, 10 and 11.

Figure 9:
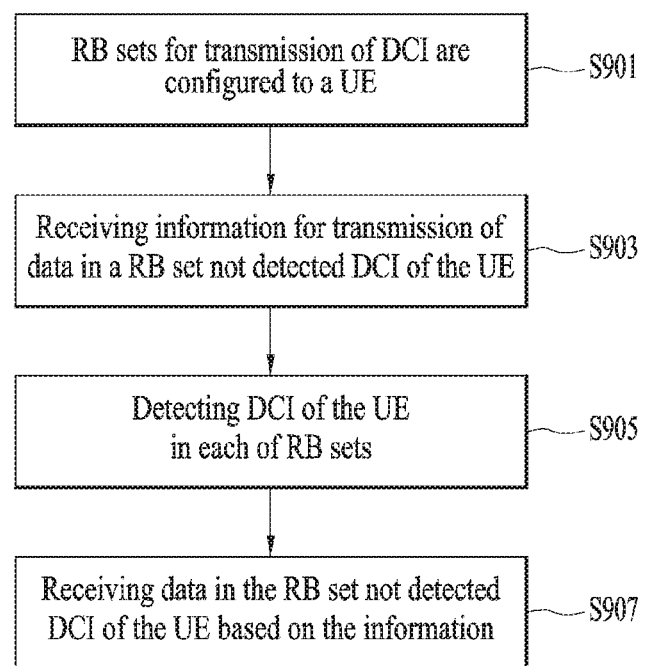
FIG. 9 is a flowchart illustrating an embodiment of receiving data in a resource block set configured for DCI transmission at a UE according to the present disclosure.

With reference made first to FIG. 9, a UE operation will be described. A UE configures a plurality of control RB sets for sDCI transmission through a BS (S901). Further, the UE receives, from the BS, information indicating whether data may be transmitted through rate matching in a control RB set in which sDCI is not detected, among the plurality of configured control RB sets (S903).

The UE then attempts to detect sDCI in each of the control RB sets configured by the BS (S905), and receives data in configured control RB sets according to the detection results. That is, if the information received in step S903 indicates that data is transmitted through rate matching in a control RB set in which sDCI is not detected, the UE may attempt to decode data in a control RB set in which sDCI has not been detected. On the contrary, if the received information indicates that data is not transmitted through rate matching in a control RB set in which sDCI is not detected, the UE does not attempt data decoding in the control RB set in which sDCI has not been detected (S907).

Figure 10:
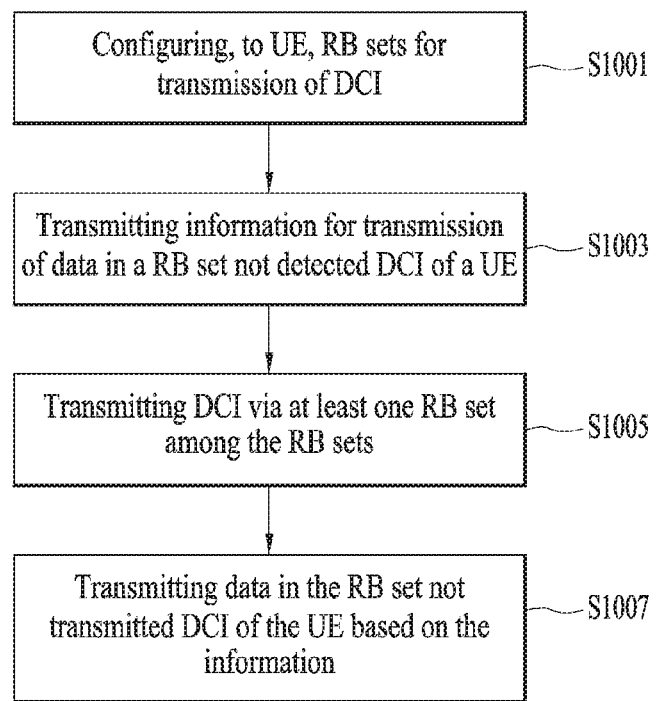
FIG. 10 is a flowchart illustrating an embodiment of transmitting data in a resource block set configured for DCI transmission at a base station (BS) according to the present disclosure.

With reference to FIG. 10, a BS operation according to the foregoing embodiment will be described below.

Referring to FIG. 10, the BS configures a plurality of control RB sets for sDCI transmission for the UE (S1001). Further, the BS transmits, to the UE, information indicating whether data may be transmitted through rate matching in a control RB set in which sDCI is not detected among the plurality of configured control RB sets (S1003).

The BS then transmits sDCI in at least one of the configured control RB sets (s1005). Further, the BS may transmit data through rate matching in a resource area that does not carry sDCI among the configured control RB sets. Herein, the BS may transmit the data based on the information transmitted in step S1003. That is, if the information transmitted in step S1003 indicates that data is not transmitted in a control RB set in which sDCI is not detected, the BS may not transmit data in the control RB set. On the contrary, if the information indicates that data may be transmitted through rate matching in a control RB set in which sDCI is not detected, the BS may transmit data through rate matching in the control RB set to the UE (S1007).

Figure 11:
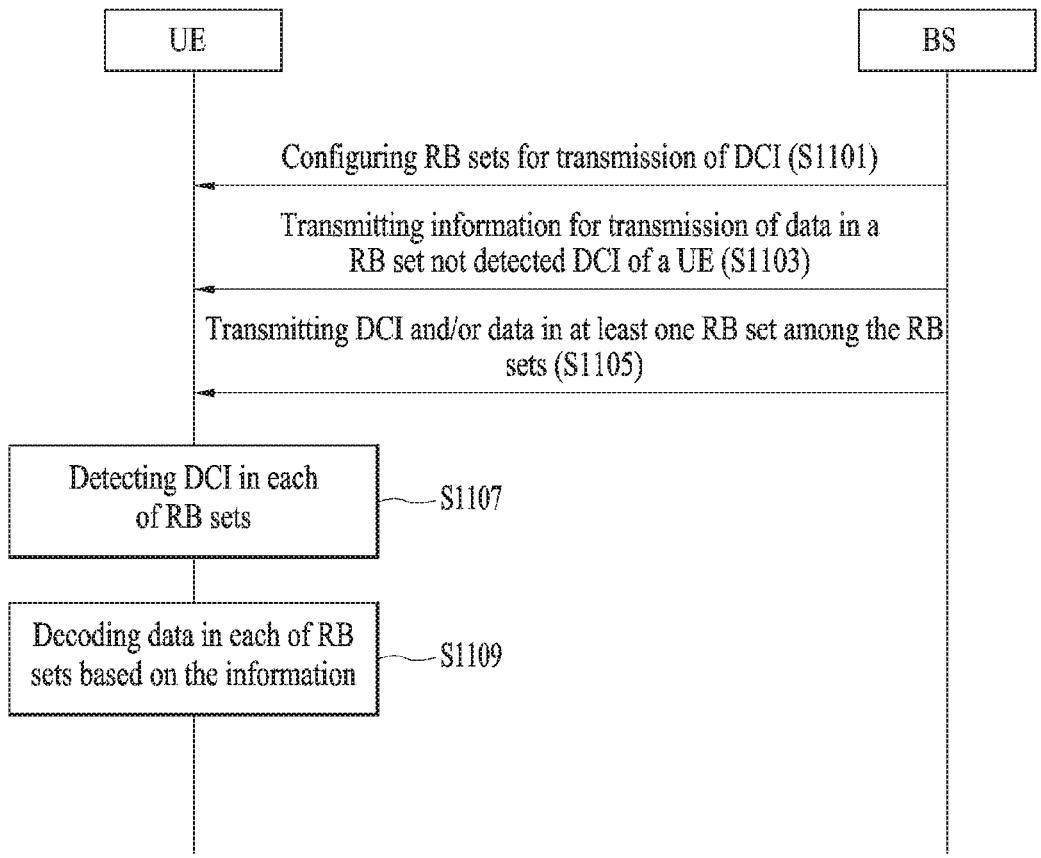
FIG. 11 is a diagram illustrating a signal flow for an embodiment of transmitting and receiving data in a resource block set configured for DCI transmission according to an embodiment of the present disclosure.

With reference to FIG. 11, an overall operation of a communication system according to the foregoing embodiment will be described below.

Referring to FIG. 11, a communication system according to the present disclosure may include one or more BSs and one or more UEs.

According to an embodiment of the present disclosure, a BS in the communication system according to the present disclosure configures control RB sets for sDCI transmission for a UE (S1101). Further, the BS transmits, to the UE, information indicating whether data may be transmitted through rate matching in a control RB set in which sDCI is not detected (S1103). The BS may then transmit sDCI and data in the configured control RB sets based on the information transmitted in step S1103. That is, if the information transmitted in step S1103 indicates that data may be transmitted through rate matching in a control RB set in which sDCI is not detected, the BS may transmit data through rate matching in the control RB set. On the contrary, if the information transmitted in step S1103 indicates that data is not transmitted in a control RB set in which sDCI is not detected, the BS may not transmit data in the control RB set (S1105).

Upon receipt of a signal in the configured control RB sets, the UE attempts to detect sDCI in each of the control RB sets (S1107). The UE then attempts to decode data in each of the control RB sets, based on the information received in step S1103. That is, if the information received in step S1103 indicates that data is not transmitted in a control RB set in which sDCI is not detected, the UE does not attempt to decode data in the control RB set. On the contrary, if the information received in step S1103 indicates that data may be transmitted through rate matching in a control RB set in which sDCI is not detected, the UE may also attempt data decoding in the control RB set (S1109).

The BS may indicate corresponding information to the UE by sharing, with the UE, an indication bit indicating whether data is transmitted rate-matched in an adjacent symbol to an sREG carrying sDCI in the same RB in a control RB set in which sDCI for the UE is detected. For example, the BS may simultaneously indicate to the UE by a 1-bit indicator whether data is transmitted through rate matching in an adjacent symbol to an sREG carrying DCI in the same RB in a control RB set in which sDCI for the UE is detected and whether data is transmitted through rate matching in a control RB set in which sDCI for the UE is not detected.

Various combinations of the indication operations may be available. For example, each piece of information may be indicated independently by 1 bit. In other words, a 1-bit indicator indicating whether data is transmitted through rate matching in an adjacent symbol to an sREG carrying DCI in the same RB in a control RB set in which sDCI for the UE is detected and a 1-bit indicator indicating whether a control RB set in which sDCI for the UE is not detected is wholly empty or data is transmitted through rate matching in the control RB set may be transmitted respectively to the UE. Each of the 1-bit indicators may be transmitted by higher-layer signaling and/or physical-layer signaling.

That is, both of the bits may be indicated by higher-layer signaling or physical-layer signaling. Alternatively, one of the bits may be indicated by physical-layer signaling, and the other bit may be indicated by higher-layer signaling.

This scheme may be applied commonly to all embodiments of the present disclosure in which various bits are transmitted in combination. Further, the UE may receive a signal from the BS, assuming that data is not transmitted in a corresponding area in a control RB set in which sDCI for the UE is not detected, receive an indicator indicating whether data is rate-matched only in a control RB set in which sDCI is detected, and receive data in the control RB set in which sDCI is detected according to the indicator. These embodiments may be applied to only one of the localized mapping scheme and the distributed mapping scheme.

Further, the BS may indicate a predefined area in a control RB set to the UE by higher-layer signaling and/or physical-layer signaling. The predefined area may always be used for sDCI transmission to another UE. On the other hand, it may be indicated to the UE whether data is transmitted through rate matching in the predefined area by higher-layer signaling and/or physical-layer signaling, and the UE may receive data in the predefined area based on the signaling. The predefined area may be configured in units of an sREG, an sCCE, or an RB.

Besides, whether to perform bit indication may depend on the number of symbols in a control RB set and/or a transmissions scheme (e.g., CRS-based transmission or DMRS-based transmission). In other words, the presence or absence of a corresponding bit indication field in an sDCI format may vary.

Further, whether to apply a bit indication scheme for multiplexing between control information and data may depend on a mapping rule in a control RB set. For example, if a control RB set is configured by localized mapping, sDCI transmitted in the control RB set may be transmitted without any separate bit indication for multiplexing between control information and data. In this case, the data may be rate-matched only in consideration of the sDCI for the UE in the control RB set.

On the other hand, if a control RB set is configured by distributed mapping, sDCI transmitted in the control RB set may include a bit indication field for multiplexing between control information and data. Herein, data may be transmitted in an area indicated by the bit indication field in the control RB set.

When the UE blind-decodes sDCI in a control RB set configured by localized mapping, the UE may attempt the BD on the assumption of the size of sDCI without the bit indication field, whereas when the UE blind-decodes sDCI in a control RB set configured by distributed mapping, the UE may attempt the BD on the assumption of the size of sDCI including the bit indication field.

The bit indication field applied to a control RB set configured by distributed mapping may have a fixed size, or different sizes according to various conditions described in the present disclosure. For example, the bit indication field may be set to different sizes according to system bandwidths and/or the sizes of control RB sets. In the present disclosure, it is apparent that a control RB set may refer to an RB set configured for control information transmission on a control channel.

Further, the bit indication field may have a different number of bits according to a system bandwidth or the number of CCEs and/or the number of RBs in a control resource set.

This is because the size of a resource allocation (RA) field may vary according to a system bandwidth, and as the size of an sDCI format increases, that is, an SCI format has a larger payload size, addition of more bits to the sDCI format may critically affect the performance of sDCI transmission.

In the present disclosure, a bit indicated by a field (e.g., bitmap) in an sDCI format may be indicated by physical-layer signaling or higher-layer signaling.

Figure 12:
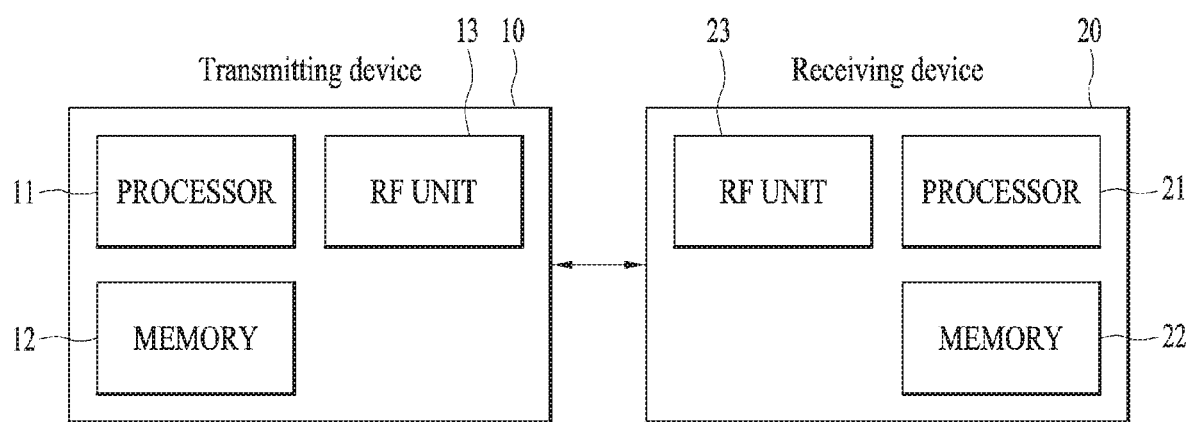
FIG. 12 is a block diagram illustrating components of a transmitting device 10 and a receiving device 20 for implementing the present disclosure.

FIG. 12 is a block diagram illustrating components of a transmitting device 10 and a receiving device 20 which implement the present disclosure.

The transmitting device 10 and the receiving device 20, respectively include radio frequency (RF) units 13 and 23 which transmit or receive radio signals carrying information/and or data, signals, and messages, memories 12 and 22 which store various types of information related to communication in a wireless communication system, and processors 11 and 21 which are operatively coupled with components such as the RF units 13 and 23 and the memories 12 and 22, and control the memories 12 and 22 and/or the RF units 13 and 23 to perform at least one of the foregoing embodiments of the present disclosure.

The memories 12 and 22 may store programs for processing and control of the processors 11 and 21, and temporarily store input/output information. The memories 12 and 22 may be used as buffers.

The processors 11 and 21 generally provide overall control to the operations of various modules in the transmitting device or the receiving device. Particularly, the processors 11 and 21 may execute various control functions to implement the present disclosure. The processors 11 and 21 may be called controllers, microcontrollers, microprocessors, microcomputers, and so on. The processors 11 and 21 may be achieved by various means, for example, hardware, firmware, software, or a combination thereof. In a hardware configuration, the processors 11 and 21 may be provided with application specific integrated circuits (ASICs), digital signal processors (DSPs), digital signal processing devices (DSPDs), programmable logic devices (PLDs), field programmable gate arrays (FPGAs), etc. In a firmware or software configuration, firmware or software may be configured to include a module, a procedure, a function, or the like. The firmware or software configured to implement the present disclosure may be provided in the processors 11 and 21, or may be stored in the memories 12 and 22 and executed by the processors 11 and 21.

The processor 11 of the transmitting device 10 performs a predetermined coding and modulation on a signal and/or data which is scheduled by the processor 11 or a scheduler connected to the processor 11 and will be transmitted to the outside, and then transmits the encoded and modulated signal and/or data to the RF unit 13. For example, the processor 11 converts a transmission data stream to K layers after demultiplexing, channel encoding, scrambling, modulation, and so on. The encoded data stream is referred to as a codeword, equivalent to a data block provided by the MAC layer, that is, a transport block (TB). One TB is encoded to one codeword, and each codeword is transmitted in the form of one or more layers to the receiving device. For frequency upconversion, the RF unit 13 may include an oscillator. The RF unit 13 may include Nt transmission antennas (Nt is a positive integer equal to or greater than 1).

The signal process of the receiving device 20 is configured to be reverse to the signal process of the transmitting device 10. The RF unit 23 of the receiving device 20 receives a radio signal from the transmitting device 10 under the control of the processor 21. The RF unit 23 may include Nr reception antennas, and recovers a signal received through each of the reception antennas to a baseband signal by frequency downconversion. For the frequency downconversion, the RF unit 23 may include an oscillator. The processor 21 may recover the original data that the transmitting device 10 intends to transmit by decoding and demodulating radio signals received through the reception antennas.

Each of the RF units 13 and 23 may include one or more antennas. The antennas transmit signals processed by the RF units 13 and 23 to the outside, or receive radio signals from the outside and provide the received radio signals to the RF units 13 and 23 under the control of the processors 11 and 21 according to an embodiment of the present disclosure. An antenna may also be called an antenna port. Each antenna may correspond to one physical antenna or may be configured to be a combination of two or more physical antenna elements. A signal transmitted from each antenna may not be further decomposed by the receiving device 20. An RS transmitted in correspondence with a corresponding antenna defines an antenna viewed from the side of the receiving device 20, and enables the receiving device 20 to perform channel estimation for the antenna, irrespective of whether a channel is a single radio channel from one physical antenna or a composite channel from a plurality of physical antenna elements including the antenna. That is, the antenna is defined such that a channel carrying a symbol on the antenna may be derived from the channel carrying another symbol on the same antenna. In the case of an RF unit supporting MIMO in which data is transmitted and received through a plurality of antennas, the RF unit may be connected to two or more antennas.

In the present disclosure, the RF units 13 and 23 may support reception BF and transmission BF. For example, the RF units 13 and 23 may be configured to perform the exemplary functions described before with reference to FIGS. 1 to 11 in the present disclosure. In addition, the RF units 13 and 23 may be referred to as transceivers.

In embodiments of the disclosure, a UE operates as the transmitting device 10 on UL, and as the receiving device 20 on DL. In the embodiments of the disclosure, an eNB operates as the receiving device 20 on UL, and as the transmitting device 10 on DL. Hereinafter, a processor, an RF unit, and a memory in a UE are referred to as a UE processor, a UE RF unit, and a UE memory, respectively, and a processor, an RF unit, and a memory in an eNB are referred to as an eNB processor, an eNB RF unit, and an eNB memory, respectively.

The eNB processor of the present disclosure controls the transceiver to transmit information about control RB sets for sDCI transmission to the UE, so that the control RB sets for sDCI transmission may be configured for the UE. Further, the eNB processor controls the transceiver to transmit, to the UE, information indicating whether data may be transmitted rate-matched in a control RB set in which sDCI is not detected, among the configured plurality of control RB sets.

The eNB processor controls the transceiver to transmit sDCI to the UE in at least one of the configured control RB sets. Further, the eNB processor may control the transceiver to transmit data through rate matching in a resource area which does not carry the sDCI among the configured control RB sets. Herein, the eNB processor may control the transceiver based on the information transmitted to the UE.

That is, if the information transmitted to the UE indicates that data is not transmitted in a control RB set in which sDCI is not detected, the eNB processor may control the transceiver not to transmit data in the control RB set. On the other hand, if the information transmitted to the UE indicates that data may be transmitted in a control RB set in which sDCI is not detected, the eNB processor may control the transceiver to transmit data through rate matching in the control RB set.

On the contrary, the information transmitted to the UE may indicate that data is not transmitted in a control RB set in which sDCI is detected. In this case, the eNB processor may control the transceiver not to transmit data in the control RB set. On the other hand, if the transmitted information indicates that data may be transmitted in a control RB set in which sDCI is detected, the eNB processor may control the transceiver to transmit data through rate matching in the control RB set.

The UE processor of the present disclosure controls the transceiver to receive information about a plurality of control RB sets for sDCI transmission from the eNB, and configures the plurality of control RB sets. Further, the UE processor may control the transceiver to receive information indicating whether data may be transmitted through rate matching in a control RB set in which sDCI is not detected.

Then, the UE processor attempts to detect the sDCI in each of the configured control RB sets, and controls the transceiver to receive data in the configured control RB sets according to the detection results. That is, if the information received from the eNB indicates that data is transmitted through rate matching in a control RB set in which sDCI is not detected, the UE processor may attempt to decode data in the control RB set in which the sDCI has not been detected. On the other hand, if the information received from the eNB indicates that data is not transmitted in a control RB set in which sDCI is not detected, the UE processor does not attempt to decode data in the control RB set in which the sDCI has not been detected.

On the contrary, the information received from the eNB may indicate that data is not transmitted in a control RB set in which sDCI is detected. In this case, the UE processor may not attempt to decode data in the control RB set. On the other hand, if the transmitted information indicates that data is transmitted in a control RB set in which sDCI is detected, the UE processor may control the transceiver to receive data in the control RB set.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting and receiving DL data have been described above in the context of a 3GPP LTE system, the method and apparatus are also applicable to various wireless communication systems other than the 3GPP LTE system.

What is claimed is:

1. A method for receiving downlink data by a user equipment (UE) in wireless communication, the method comprising:
   receiving information related to control resource sets for Downlink Control Information (DCI);
   receiving, via a higher layer, rate matching information related to reception of the downlink data in each of the control resource sets; and
   receiving the downlink data in the control resource sets based on whether DCI is detected in the control resource sets and the rate matching information,
   wherein the downlink data is not received in a first control resource set, among the control resource sets, in which the DCI is not detected based on the rate matching information including first information,
   wherein the downlink data is received in a second control resource set in which the DCI is detected among the control resource sets based on the rate matching information including the first information, and
   wherein the first information is related to information indicating rate-matching of the downlink data for a control resource set in which the DCI is detected.

2. The method according to claim 1, wherein the downlink data is not received in a third control resource set in which the DCI is detected among the control resource sets based on the rate matching information including second information different from the first information indicating that the downlink data is not rate-matched in the control resource set in which the DCI is detected.

3. The method according to claim 1, wherein the DCI is for short Transmission Time Interval (TTI).

4. The method according to claim 1, wherein the downlink data is not mapped to Resource Element Group (REG) for the DCI.

5. A user equipment (UE) for receiving downlink data in wireless communication, the UE comprising:
   a transceiver for transmitting and receiving a radio signal with a base station (BS); and
   a processor controlling the transceiver,
   wherein the processor is configured to:
      control the transceiver to receive information related to control resource sets for Downlink Control Information (DCI);
      control the transceiver to receive, via a higher layer, rate matching information related to reception of the downlink data in each of the control resource sets; and
      control the transceiver to receive the downlink data based on whether DCI is detected in the control resource sets and the rate matching information,
      wherein the downlink data is not received in a first control resource set, among the control resource sets, in which the DCI is not detected based on the rate matching information including first information,
      wherein the downlink data is received in a second control resource set in which the DCI is detected among the control resource sets based on the rate matching information including the first information, and
      wherein the first information is related to information indicating rate-matching of the downlink data for a control resource set in which the DCI is detected.

6. The UE according to claim 5, wherein the downlink data is not received in a third control resource set in which the DCI is detected among the control resource sets based on the rate matching information including second information different from the first information indicating that the downlink data is not rate-matched in the control resource set in which the DCI is detected.

7. The UE according to claim 5, wherein the DCI is for short Transmission Time Interval (TTI).

8. The UE according to claim 5, wherein the downlink data is not mapped to Resource Element Group (REG) for the DCI.

9. A method for transmitting downlink data by a base station (BS) in wireless communication, the method comprising:
- transmitting information related to control resource sets for Downlink Control Information (DCI);
- transmitting, via a higher layer, rate matching information related to reception of the downlink data in each of the control resource sets; and
- transmitting the downlink data in the control resource sets based on whether DCI is mapped to the control resource sets and the rate matching information,
- wherein the downlink data is not transmitted in a first control resource set, among the control resource sets, in which the DCI is not mapped based on the rate matching information including first information,
- wherein the downlink data is received in a second control resource set in which the DCI is detected among the control resource sets based on the rate matching information including the first information, and
- wherein the first information is related to information indicating rate-matching of the downlink data for a control resource set in which the DCI is detected.

10. A base station (BS) for transmitting downlink data in wireless communication, the BS comprising:
- a transceiver for transmitting and receiving a radio signal with a user equipment (UE); and
- a processor controlling the transceiver,
- wherein the processor is configured to:
  - control the transceiver to transmit information related to control resource sets for Downlink Control Information (DCI);
  - control the transceiver to transmit, via a higher layer, rate matching information related to reception of the downlink data in each of the control resource sets; and
  - control the transceiver to transmit the downlink data based on whether DCI is mapped to the control resource sets and the rate matching information,
  - wherein the downlink data is not transmitted in a first control resource set, among the control resource sets, in which the DCI is not mapped based on the rate matching information including first information,
  - wherein the downlink data is received in a second control resource set in which the DCI is detected among the control resource sets based on the rate matching information including the first information, and
  - wherein the first information is related to information indicating rate-matching of the downlink data for a control resource set in which the DCI is detected.

11. An apparatus for receiving downlink data in wireless communication, the apparatus comprising:
- a memory; and
- at least one processor coupled to the memory and configured to:
  - receive information related to control resource sets for Downlink Control Information (DCI);
  - receive, via a higher layer, rate matching information related to reception of the downlink data in each of the control resource sets; and
  - receive the downlink data in the control resource sets based on whether DCI is detected in the control resource sets and the rate matching information,
  - wherein the downlink data is not received in a first control resource set, among the control resource sets, in which the DCI is not detected based on the rate matching information including first information,
  - wherein the downlink data is received in a second control resource set in which the DCI is detected among the control resource sets based on the rate matching information including the first information, and
  - wherein the first information is related to information indicating rate-matching of the downlink data for a control resource set in which the DCI is detected.

* * * * *